United States Patent [19]

Nordlund

[11] Patent Number: 4,576,822

[45] Date of Patent: Mar. 18, 1986

[54] PROCESS FOR THE PRODUCTION OF FERMENTED MILK PRODUCTS

[75] Inventor: Viljo T. J. Nordlund, Helsinki, Finland

[73] Assignee: Valio Meijerien Keskusosuusliiki, Helsinki, Finland

[21] Appl. No.: 648,344

[22] Filed: Sep. 6, 1984

Related U.S. Application Data

[63] Continuation of Ser. No. 459,033, Jan. 18, 1983, abandoned.

[30] Foreign Application Priority Data

Jan. 22, 1982 [FI] Finland .................................. 820206

[51] Int. Cl.[4] .......................... A23C 9/12; A23C 17/02
[52] U.S. Cl. ........................................ 426/43; 426/583
[58] Field of Search ..................... 426/36, 38, 40, 42, 426/63, 583, 580, 43

[56] References Cited

U.S. PATENT DOCUMENTS 2,781,269  2/1957  Harper et al. ........................ 426/36
4,082,853  4/1978  Szadkowska et al. ............... 426/40

FOREIGN PATENT DOCUMENTS 2232614  10/1973  Fed. Rep. of Germany .
2442592   8/1980  France ................................... 426/40
2442594   8/1980  France ................................... 426/40
  71591   4/1972  South Africa ......................... 426/40
 724363   6/1972  South Africa .
 884762  12/1961  United Kingdom .

OTHER PUBLICATIONS

"Das gross Mokerei-Lexicon," I, pp. 458–459 (Note: a translation of relevant passage given in Disclosure Statement).

Primary Examiner—Raymond Jones
Assistant Examiner—Marianne M. Cintins
Attorney, Agent, or Firm—Cushman, Darby & Cushman

[57] ABSTRACT

A process for the production of fermented milk products is disclosed wherein milk is treated in a cold state with a rennet enzyme used for cheesemaking. The rennet-treated milk is thereafter heat treated in order to convert the paracasein of the milk to calcium paracaseinate and to inactivate the rennet enzyme, and the product thus obtained is treated in a conventional manner to produce the desired fermented milk product.

13 Claims, 1 Drawing Figure

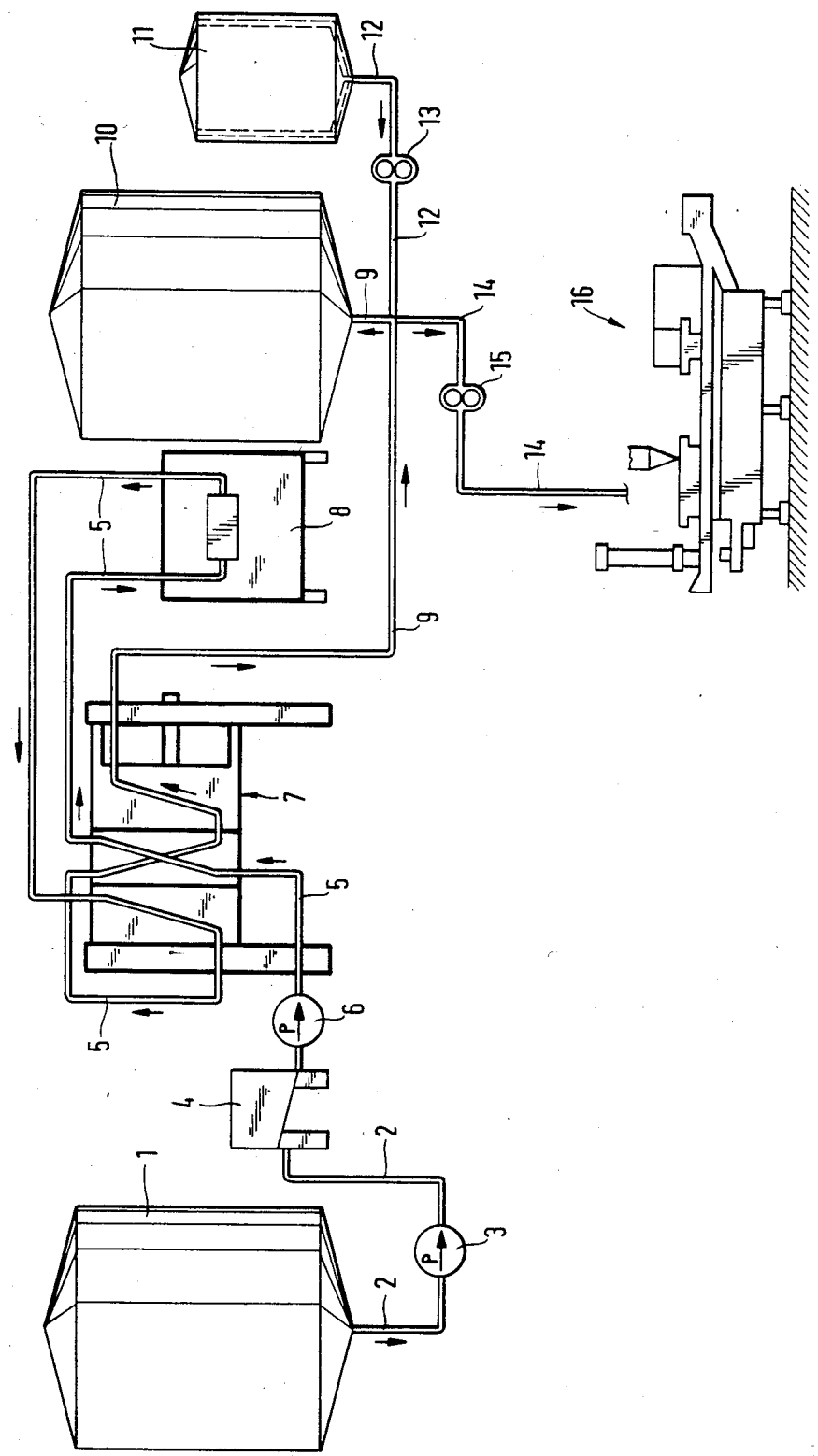

PROCESS FOR THE PRODUCTION OF FERMENTED MILK PRODUCTS

CROSS REFERENCE TO RELATED APPLICATIONS

This application is a continuation of my earlier application Ser. No. 459,033 filed Jan. 18, 1983, now abandoned.

BACKGROUND OF THE INVENTION

1. Field of the Invention

The present invention relates to a process for the production of fermented milk products.

2. Description of the Prior Art

Fermented milk products, such as curdled milk, yogurt and cultured buttermilk, are characterized on the one hand by an acidity and aroma produced by lactic-acid bacteria and on the other hand by a thick consistency. In products to be eaten with a spoon, the structure is gel-like, sometimes stretchy, and in products to be drunk it is semifluid, possibly stretchy. In both principal types of products, the aim is to obtain a stable structure in which the whey does not separate from the curd.

The structure of fermented milk products prepared in the conventional manner without additives such as stabilizers is obtained by a strong heat treatment of the raw milk, in practice at above 90° C. for 5–30 minutes. The soluble proteins, the so-called whey proteins, of the milk are thereby denatured. Their colloidal properties change in such a way that they, together with the casein of the milk, take up significantly more of the water of their surroundings than they do in the undenatured state. After lactic-acid fermentation, the typical structure of the products forms. In some cases the structure is also affected by capsules formed by lactic-acid bacteria around themselves. Whether the product will be eatable with a spoon or drinkable is determined by the method of ripening.

Since the heating required for producing the structure of the product is of long duration, the energy-efficient plate heat exchangers which are commonly used for the pasteurization of milk and by means of which a regeneration of over 90% is achieved, cannot be used alone.

In process technology, the traditional heat treatment stage for fermented milk products is realized by means of a long-duration heat treatment. The apparatus required for this can be, for example, either a closed cylinder or series of cylinders coupled in a position following the heating compartment of the plate heat exchanger, the required long-duration heating being achieved in its flow expansions, or a processing tank coolable to the fermentation temperature. In these, losses of heat are significant.

As regulation and control techniques become more advanced, the aim is, for reasons of cost and operational reliability, to carry out dairy processes and important washing and sanitizing steps in a programmed manner under remote control or automatically. The current long-duration heating systems for fermented milk products, with their flow expansions, constitute obstacles to the most economical applications of regulation and control systems.

SUMMARY OF THE INVENTION

The object of the present invention is therefore to provide a process for producing fermented milk products, a process which can be processed out in a programmed manner under remote control or automatically without needing to use long-duration heating equipment which is complicated in terms of flow technology, and the required heat treatment can be carried out energy-efficiently by means of a conventional plate heat exchanger, a process by which fermented milk products of an even quality can be produced.

The process according to the invention is characterized in that the milk is treated at a temperature of 0°–5° C. with a rennet enzyme used for cheese production or with some other proteolytic enzyme having a similar action, by using a rennet enzyme solution which contains 1/5–1/15 million rennet activity units, the solutuin being added at 0.25–0.5% of the amount of milk, the milk treated with the rennet enzyme is heat treated in order to convert the paracasein of the milk to calcium paracaseinate and to inactivate the rennet enzyme, whereafter the product thus obtained is fermented by a method itself known and ripened to produce the fermented milk product desired.

The treatment with a rennet enzyme can be carried out either as a batch process by adding a rennet enzyme solution to prestandardized milk in a tank or as a continuous process by directing prestandardized milk through an enzyme reactor.

The heat treatment can be carried out at a temperature of 72°–105° C. for 10–20 seconds, preferably using a plate heat exchanger and preferably in such a manner that the milk is pasteurized at the same time.

The action on milk of the rennet enzymes used for cheese production can be divided into three stages, i.e. a primary reaction, a secondary reaction, and a tertiary reaction.

During the primary reaction, full casein is converted by the action of the rennet to paracasein, at which time the proteolytic action of the enzyme detaches γ-casein from the casein micella and the γ-casein dissolves. At the same time the α- and β-caseins are activated. The primary reaction is independent of the temperature.

The protective action of γ-casein on the α- and β-caseins having disappeared during the primary reaction, during the secondary reaction the paracasein and the calcium ions of the milk combine to form calcium paracaseinate, which is the frame of the gel-like coagulum known in cheesemaking. The secondary reaction is highly dependent on the temperature, whereas the secondary reaction is not observed in cold milk. Thus, if cold-coagulated milk is heated, for example to a temperature of 60° C., the coagulum or calcium paracaseinate is formed instantaneously. If, in this case, rennet enzyme is used in an amount clearly below the amounts typical of cheesemaking, and the secondary reaction is carried out by elevating the temperature under turbulent conditions, the result obtained is a fine-grained calcium paracaseinate precipitate in the milk.

During the tertiary reaction the proteolytic action of the rennet enzyme continues, the casein being subject to further decomposition.

The present invention is based on the utilization of the difference between the primary and the secondary reactions of rennet enzymes in the production of fermented milk products. When, according to the method of the invention, cold milk is treated with a rennet enzyme, the primary reaction described above occurs, but not the secondary reaction, and when the cold-coagulated milk is thereafter heat treated, the secondary reaction, i.e. the formation of calcium paracaseinate occurs. During the heat treatment stage the rennet enzyme is simultaneously inactivated, and so there is no tertiary reaction in the process according to the invention.

The milk which has been subjected to a treatment with a rennet enzyme and to a heat treatment is thereafter treated further in the same manner as in the production of conventional fermented milk products. In the process for producing fermented milk products according to the invention, the structure of the product is thus obtained primarily by changing the hydrocolloidal properties of casein by means of a controlled rennet enzyme treatment and not by a heat denaturation of whey proteins as is done in the art used so far.

In terms of process control it is important in the process of the invention that the activity of the rennet enzyme is not too high, since in that case the milk would coagulate in the heat exchanger during the heat treatment stage. A suitable activity for the rennet enzyme is 1/5-1/15 million rennet activity units, and the rennet enzyme solution can be added at 0.25-0.5% of the amount of milk, in which case no coagulation occurs.

When the process according to the invention is used, the process for the production of fermented milk products is simplified and is suitable for being remote-controlled or automated in a programmed manner, since in this case no additional long-duration heating equipment, complicated in terms of flow technology, is necessary, and the required heat treatment can be carried out by means of plate heat exchangers. At the same time the process apparatus is easy to wash and sanitize under programmed remote control.

The accompanying drawing shows schematically an apparatus used for carrying out the process of the invention.

DESCRIPTION OF THE PREFERRED EMBODIMENT

In the drawing, 1 indicates a tank in which milk, prestandardized by a method itself known, is maintained at a temperature of 0°-5° C. For example, 1/15 million rennet activity units of a natural rennet solution is added into the tank 1, the amount of the solution being 0.25-0.50 % of the amount of milk, and the rennet is allowed to act for 0.5-16 hours. The primary reaction described above occurs in the tank 1.

Thereafter the cold-coagulated milk is pumped via a pipe 2 equipped with a pump 3 into a conventional equalization tank 4, which ensures an even feed. From the equalization tank 4 the milk is pumped via a pipe 5 equipped with a pump 6 through the middle compartment of a plate heat exchanger 7 and from there on through a conventional homogenizer 8. In the homogenizer 8 the milk is homogenized. From the homogenizer 8 the milk is directed into the left-side compartment of the plate heat exchanger 7, in which it is heated to the desired temperature, and further through the middle compartment, in which there occurs an exchange of heat with the milk coming from the equalization tank 4, and finally through the right-side compartment of the plate heat exchanger, in which the milk is cooled to the temperature suitable for the fermented milk product desired. The conditions in the plate heat exchanger 7 are selected to be such that the secondary reaction described above occurs, and preferably in such a way that the milk is pasteurized at the same time. The heating can be, for example, to a temperature of 75° C. for 15 seconds.

From the plate heat exchanger 7 the milk is directed via a pipe 9 into a ripening tank 10, into which a ferment is also added from a ferment tank 11 in an amount appropriate for the fermented milk product desired. The ferment tank is of a type prior known in the art, and it is equipped with a heating and cooling jacket, indicated by a dotted line. The ferment is directed into the ripening tank 10 via a pipe 12 equipped with a batching pump 13. The ripening is carried out for a period suitable for the fermented milk product desired and at a temperature suitable for it. This stage is itself well known in the art and is therefore not described here in greater detail.

When the ripening has been completed, the ripened fermented milk product is directed via a pipe 14 equipped with a batching pump 15 into a packing machine 16, in which the fermented milk product is packed into consumer containers.

The ripening stage can alternatively be carried out as follows: the cold-coagulated and heat treated milk coming from the plate heat exchanger 7 via the pipe 9 is fed directly via the pipe 14 and the batching pump 15 into the packing machine 16, at which time ferment is added to it simultaneously from the ferment container 11 via the pipe 12 and the batching pump 13. The ripening occurs in this case in consumer containers, which are stored for the period required for the fermented milk product desired and at a temperature suitable for it.

Instead of the batch process described above, the production method of the invention can also be carried out as a continuous process, in which case the tank 1 is replaced with an enzyme reactor, the activity of which is adjusted to be such that the cold-coagulation desired takes place while the milk passes through the reactor.

What is claimed is:
1. A process for producing a liquid fermented milk product, comprising the successive steps of:
    (1) treating milk at a temperature of 0°-5° C. for a sufficient period of time with a solution of an enzyme selected from a rennet enzyme used for cheesemaking or proteolytic enzyme having a rennet-type action, to form a liquid, cold-coagulated milk, wherein the concentration of the enzyme solution is such that upon addition of 0.25 to 0.5% by weight of the solution, the milk contains 1/5-1/15 million rennet activity units,
    (2) subjecting the milk treated with the rennet enzyme to a heat treatment for a sufficient period of time in order to convert the paracasein of the milk to a calcium paracaseinate and to inactivate the rennet enzyme, and thereafter
    (3) innoculating the treated milk of step (2) with a sufficient amount of a starter culture of the liquid fermented milk product and subjecting the thus innoculated milk to fermentation and ripening to form the fermented milk product.

2. A process according to claim 1, wherein the treatment with a rennet enzyme is carried out as a batch process by adding a rennet enzyme solution to prestandardized milk in a tank.

3. A process according to claim 1, wherein the treatment with a rennet enzyme is carried out as a continuous process by directing prestandardized milk through an enzyme reactor.

4. A process according to claim 1, wherein the treatment with a rennet enzyme is carried out for a period of 0.5–16 hours.

5. A process according to claim 1, wherein the heat treatment is carried out at a temperature of 72°–105° C. for 10–20 seconds.

6. A process according to claim 5, wherein the heat treatment is carried out by means of a plate heat exchanger.

7. A process according to claim 5, wherein the heat treatment also pasteurizes the milk.

8. A process of producing a liquid fermented milk product in which the whey remains associated with the curd, said process comprising the steps of:
(1) subjecting prestandardized milk to a controlled rennet enzyme treatment by adding a solution of rennet enzyme to the prestandardized milk at a temperature of about 0° to about 5° C. for a sufficient period of time to form a liquid, cold-coagulated milk, wherein the concentration of the rennet solution is such that upon addition of 0.25 to 0.5% by weight of the rennet solution to the milk, the milk will contain from about 1/5 to 1/15 million rennet activity units;
(2) heating the rennet-treated milk of step (1) to a temperature of about 72° to about 105° C. and for a time sufficient to simultaneously convert the paracasein of the milk to calcium paracaseinate and to inactivate the rennet enzyme; and
(3) innoculating the treated milk of step (2) with a starter culture of the liquid fermented milk product in an amount sufficient to cause the milk product to ferment and ripen and produce the liquid fermented milk product.

9. A process according to claim 8, wherein the rennet treatment with the rennet enzyme is carried out for a period of about 0.5 to about 16 hours.

10. A process according to claim 8, wherein the heat treatment of step (2) is carried out for a period of about 10 to about 20 seconds.

11. A process according to claim 8, wherein the fermented product is curdled milk.

12. A process according to claim 8, wherein the fermented product is yogurt.

13. A process according to claim 8, wherein the fermented product is cultured buttermilk.

* * * * *